United States Patent
Li et al.

(10) Patent No.: US 8,369,773 B2
(45) Date of Patent: Feb. 5, 2013

(54) REPEATER AND SELF-EXCITATION DETECTING METHOD AND SYSTEM

(75) Inventors: Chengsheng Li, Guangdong (CN); Yali Wang, Guangdong (CN); Tianwen Ding, Guangdong (CN)

(73) Assignee: Shenzhen Grentech Co., Ltd., Guangdong (CN)

( * ) Notice: Subject to any disclaimer, the term of this patent is extended or adjusted under 35 U.S.C. 154(b) by 427 days.

(21) Appl. No.: 12/673,128

(22) PCT Filed: Aug. 7, 2008

(86) PCT No.: PCT/CN2008/071914
§ 371 (c)(1),
(2), (4) Date: Feb. 11, 2010

(87) PCT Pub. No.: WO2009/062416
PCT Pub. Date: May 22, 2009

(65) Prior Publication Data
US 2012/0120988 A1 May 17, 2012

(30) Foreign Application Priority Data
Nov. 16, 2007 (CN) .......................... 2007 1 0124555

(51) Int. Cl.
*H04B 7/15* (2006.01)
(52) U.S. Cl. .......... 455/11.1; 455/9; 455/13.1; 370/243; 370/279; 370/293; 370/315
(58) Field of Classification Search ................. 455/3.02, 455/427, 428, 430, 431, 7–9, 11.1, 12.1, 455/13.1, 13.2, 14–17; 340/425.1; 370/226, 370/293, 246, 274, 279, 315, 316, 492, 501
See application file for complete search history.

(56) References Cited

U.S. PATENT DOCUMENTS

| | | | | |
|---|---|---|---|---|
| 5,812,933 A | * | 9/1998 | Niki | .............................. 455/16 |
| 5,815,795 A | * | 9/1998 | Iwai | ................................. 455/9 |
| 8,060,009 B2 | * | 11/2011 | Gainey et al. | ................... 455/15 |
| 2004/0235417 A1 | * | 11/2004 | Dean | .............................. 455/10 |

(Continued)

FOREIGN PATENT DOCUMENTS
WO 2005002109 1/2005

OTHER PUBLICATIONS
International Search Report of PCT/CN2008/071914 dated Nov. 20, 2008.

*Primary Examiner* — Dominic E Rego
(74) *Attorney, Agent, or Firm* — Rankin Hill & Clark LLP

(57) ABSTRACT

The present invention relates to the communication field and provides method and system for detecting repeater self-excitation and the repeater using the method and system. The method includes detecting an output power of an up link; judging whether the detected output power of the up link exceeds a threshold of self-excitation and, if so, adding a numerically-controlled attenuation to the up link accordingly; and judging whether the change in the output power of the up link is equal to that in the numerically-controlled attenuation and, judging whether the repeater is subject to a self-excitation according to the result of judgment regarding the change in the output power of the up link. The repeater self-excitation detecting method has the following advantages: 1. The self-excitation can be detected in time, thus avoiding had effect on the communication system; 2. The devices of repeater can be protected from being burned down; and 3. The cost incurred by the patrol inspection personnel can be reduced.

8 Claims, 3 Drawing Sheets

U.S. PATENT DOCUMENTS

| | | | |
|---|---|---|---|
| 2007/0071128 A1* | 3/2007 | Meir et al. | 375/297 |
| 2008/0076463 A1* | 3/2008 | Bednekoff et al. | 455/522 |
| 2008/0293360 A1* | 11/2008 | Maslennikov et al. | 455/24 |

* cited by examiner

REPEATER AND SELF-EXCITATION DETECTING METHOD AND SYSTEM

BACKGROUND OF THE INVENTION

1. Field of the Invention

The present invention relates to the communication field and, more particularly, to a repeater and its self-excitation detecting method and system.

2. Description of Related Art

A repeater is an important component of the communication system and has a direct effect on the stability of the whole communication system. With the development of communication industry, the requirements for the repeater become stricter. The repeater, as an amplifying device, may cause a self-excitation if its engineering design is improper. The self-excitation will exert an influence on the repeater and seriously affect the relevant base station, thereby resulting in that the whole communication system fails to work normally, which will affect the quality of communication and may further lead to the paralysis of the whole communication network. Especially, CDMA system is more sensitive to the repeater self-excitation because it is a self-interference system with network coverage of respiration effect.

When the self-excitation occurs in the repeater, it is generally dealt with by the following two methods. In one method, the professional personnel use a testing device to detect the self-excitation by patrol inspection. However, this method involves the cost of manpower and instruments etc, and responds slowly due to the fact that the patrol inspection may not be at the right time. Or the self-excitation is dealt with only when it has an effect on the operation of network, so customers become increasingly unsatisfied with this method. The other method refers to that there should be an enough isolation between the donor antenna and the repeater antenna during engineering design, so as to avoid the generation of self-excitation. Generally an enough distance is kept between the donor antenna and the repeater antenna, or a shielding mesh is disposed between the donor antenna and the repeater antenna, ensuring a proper isolation between the donor antenna and the repeater antenna. However, this method is seldom put into operation because it may be subject to the limitation of geographic location or involve the increase in the cost of engineering design.

FIG. 1 is a structural block diagram of the existing repeater. As shown in FIG. 1, the repeater is mainly composed of a donor antenna 101, a first duplexer 102, an up power amplifier 103, a monitoring unit 104, a first radio-frequency numerically-controlled attenuator 105, an up low-noise amplifier 106, a second duplexer 107, a repeater antenna 108, a down power amplifier 109, a second radio-frequency numerically-controlled attenuator 110, and a down low-noise amplifier 111. The working process is described below in detail.

Working process in the down link is that: the donor antenna 101 receives from the space a downlink signal that may contain some noises, and then the downlink signal enters the first duplexer 102 of the repeater through a radio frequency connection cable. The first duplexer 102 sorts out the signal with the set frequency range by filtering, and sends the signal to the down low-noise amplifier 111 in which the weak signal is amplified. After amplification, the downlink signal, via the second radio-frequency numerically-controlled attenuator 110, is sent to the down power amplifier 109 in which the downlink signal is amplified into the high power downlink signal. Then the downlink signal, via the second duplexer 107, is transmitted to the repeater antenna 108 which in turn emits the downlink signal to the area required to be coverage. The processes of receiving, amplifying and retransmitting the downlink signal to the specified area are thus accomplished.

Working process in the up link is that: the repeater antenna 108 receives from the space the uplink signal that may contain some noises, and then the uplink signal enters the second duplexer 107 of the repeater through the radio frequency connection cable. The second duplexer 107 sorts out the signal with the set frequency range by filtering, and sends the signal to the up low-noise amplifier 106 in which the weak signal is amplified. After amplification, the uplink signal, via the first radio-frequency numerically-controlled attenuator 105, is sent to the up power amplifier 103 in which the uplink signal is amplified into the high power uplink signal. Then the uplink signal, via the first duplexes 102, is transmitted to the donor antenna 101 which in turn emits the uplink signal to the receiving base station. The processes of receiving, amplifying and retransmitting the uplink signal to the specified receiving base station are thus accomplished.

In practice, if there is insufficient isolation between the donor antenna 101 and the repeater antenna 108, the signal emitted by the repeater antenna 108 may be received by the donor antenna 101. Due to the fact that the signal lies within the working frequency range of the repeater, the signal may be amplified again using the process discussed above, generating a positive feedback and continuously circulating in this way, which is the so-called self-excitation. If the self-excitation occurs in the repeater, the signal of positive feedback can have a significant effect on local communication signals, and may burn down the devices in the repeater or even lead to the paralysis of communication system in case of a severe self-excitation.

At present, with the fierce competition in the telecommunication industry, it is urgent to ensure the reliability of communication system as well as the betimes of solving problems. Therefore, it is required to design a method to detect the self-excitation in the repeater in time and remove the defects in the system in real time in case of self-excitation existing in the devices of repeater, so as to solve the problems that the patrol inspection personnel fail to deal with in time.

SUMMARY OF THE INVENTION

An embodiment of the invention is to provide a method for detecting the self-excitation in the repeater, so as to solve the problems that the existing detecting method fail to detect the self-excitation in time.

The embodiment of the invention is realized through a self-excitation detecting method for the repeater. The detecting method includes:

detecting the output power of the up link;

judging whether the detected output power of the up link exceeds the threshold of self-excitation; if so, adding the numerically-controlled attenuation to the up link accordingly;

judging whether the change in the output power of the up link is equal to that in the numerically-controlled attenuation, and determining whether the repeater is subject to a self-excitation according to the foregoing judging result.

Another embodiment of the invention is to provide a self-excitation detecting system for the repeater. The self-excitation detecting system includes:

an output power detecting unit, used for detecting and saving the output power of the up link;

a self-excitation threshold comparing unit, used for judging whether the output power of the up link detected by the output power detecting unit exceeds the preset self-excitation threshold, and, if so, adding the numerically-controlled attenuation to the up link accordingly;

a self-excitation judging unit, which is used for judging whether the change in the output power of the up link is equal to that in the numerically-controlled attenuation after the self-excitation threshold comparing unit adds the numerically-controlled attenuation and determining whether the repeater is subject to a self-excitation according to the foregoing judging result.

Still another embodiment of the invention is to provide a repeater containing the above-mentioned self-excitation detecting system.

The self-excitation detecting method and system of the repeater and repeater specified in the embodiment of the invention possess the following advantages.

1. The self-excitation can be detected in time, thus avoiding bad effect on the communication system;

2. The devices of repeater can be protected from being burned down; and

3. The cost incurred by the patrol inspection personnel can be reduced.

DESCRIPTION OF THE EMBODIMENTS

Figure 1:
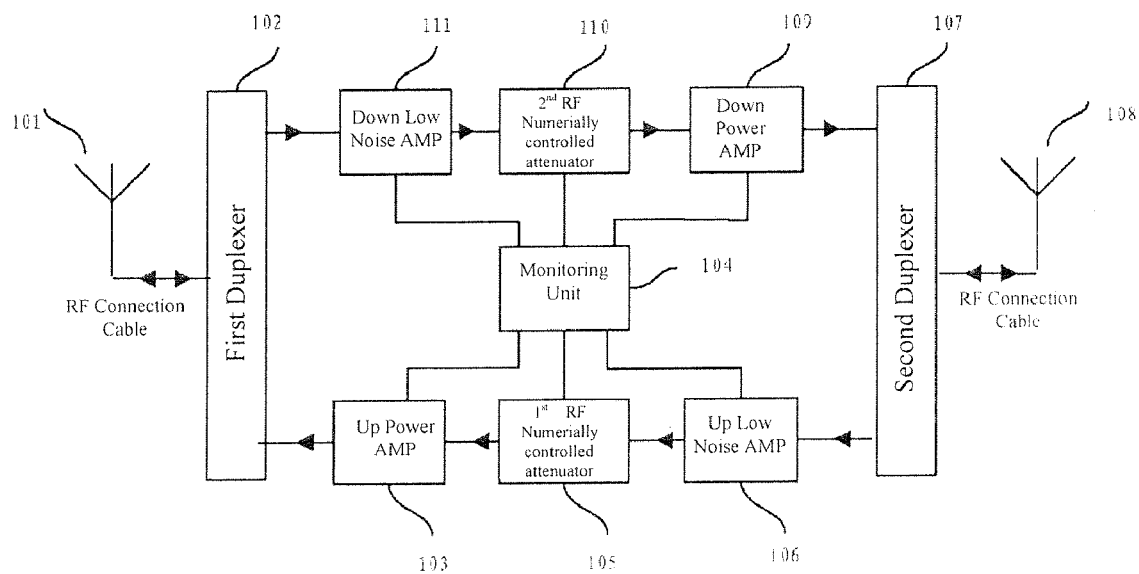
FIG. 1 is a conventional block diagram of a repeater.

Considering the problems in the current technology, this inventor, based on the years of experience in the product design and engineering application, puts forward a kind of self-excitation detecting method, system and repeater on the basis of the current repeater.

The invention is described as follows with reference to the exemplary embodiments and the attached drawings.

Generally, the self-excitation is caused due to the fact that the isolation of signal (namely the inhibition of radio frequency signal) is less than the gain of repeater. The self-excitation of repeater may be generated in the up link and/or the down link. According to the practical engineering experience, the difference between the isolation of the up link and the down link is moderate. However, in order to keep balance between the up link and the down link in the communication system during engineering design, the difference between the actual gain of the up link and the down link is moderate too. Therefore, in the embodiment of the invention, the up link is taken as the self-excitation detecting link.

The flow chart of the self-excitation detecting method for the repeater provided by the embodiment of the invention can be found in FIG. 2, and is described as follows:

The output power of the up link is detected and saved at step S201;

The detecting of the output power frequency of the up link can be set according to practical needs, for instance, 0.01 second and 0.1 second etc.

At step S202, whether the detected output power of the up link exceeds the preset self-excitation threshold is judged;

If the detected output power of the up link doesn't exceed the preset self-excitation threshold, it means that there is no self-excitation occurring in the repeater and then the method returns to step S201. Otherwise, it means that there may be a self-excitation occurring in the repeater. The method then proceeds to step S203 to further confirm whether there is self-excitation occurring in the repeater. In addition, the threshold of self-excitation is determined based on the power of the device.

At step S203, the numerically-controlled attenuation is added;

In the embodiment of the invention, the numerically-controlled attenuation to the up link is added when the output power of the up link is detected to exceed the threshold of self-excitation. The attenuation increment can be determined according to the control precision of the data attenuator. For example, the increment can be set as 0.5 dB, 1 dB or 2 dB at one time.

At step S204, the output power of the up link after the numerically-controlled attenuation is added is detected.

The new output power of the up link is periodically detected after the numerically-controlled attenuation is added. The period of detecting the new output power of the up link can be set based on actual requirements, for instance 0.01 second and 0.1 second etc.

At step S205, the detected output power of the up link, to which the numerically-controlled attenuation is added, is compared with the output power of the up link saved at step S201. If the change in the output power of the up link is equal to that in the numerically-controlled attenuation, the method then proceeds to step S206; otherwise, the method proceeds to step S207.

Under normal conditions, the gain of repeater is in proportional to the output power. When the gain of repeater increases, the output power will increase accordingly. The numerically-controlled attenuator operates to control the quantity of gain in the corresponding radio frequency link. When the numerically-controlled attenuation increases, the gain decreases accordingly and the output power declines. Therefore, after the numerically-controlled attenuation is added to the up link, if the variable amount of the detected output power of the up link relative to that in the output power at step S201 is equal to the change in the numerically-controlled attenuation, the method proceeds to step S206. Otherwise, the method proceeds to step S207. As used herein, the phrase "change in the numerically-controlled attenuation" refers to the variable amount between the original numerically-controlled attenuation and the one after the numerically-controlled attenuation is added. The original numerically-controlled attenuation refers to the numerically-controlled attenuation corresponding to the output power of the up link detected at step S201.

At step S206, whether there is count in the self-excitation counter is judged. If there is no count, then the method determines that there is no self-excitation occurring and then proceeds to carry out step S208 directly. Otherwise, the method goes to step S209.

1 is automatically added to the self-excitation counter at step S207. It is then judged whether the numerical value on the self-excitation counter exceeds the preset value. If so, it is then confirmed that there is self-excitation in the repeater, then execute step S209. Otherwise, the method returns to S203 to continue confirming.

Figure 2:
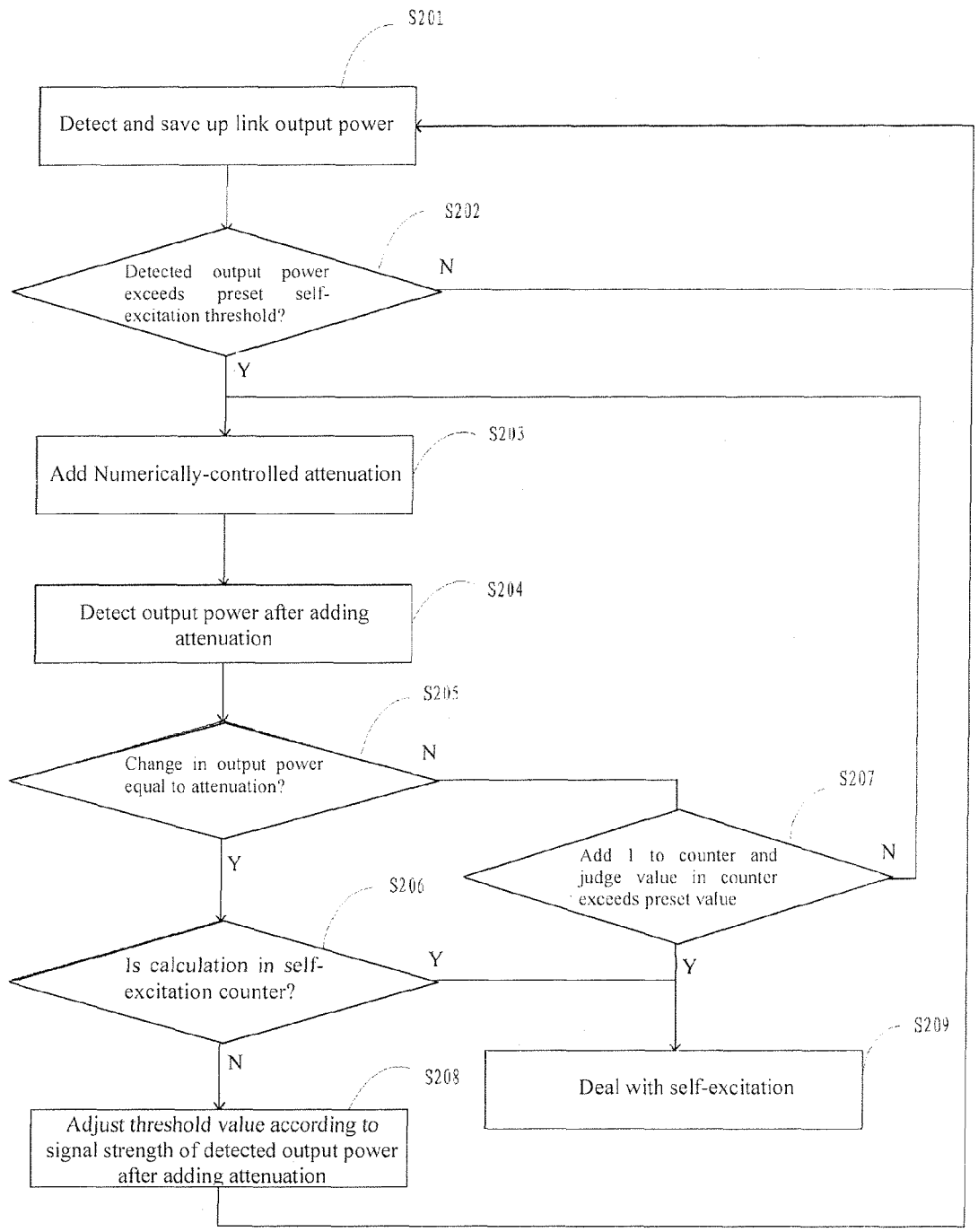
FIG. 2 is a flow chart of one embodiment of a self-excitation detecting method for the repeater.
Figure 3:
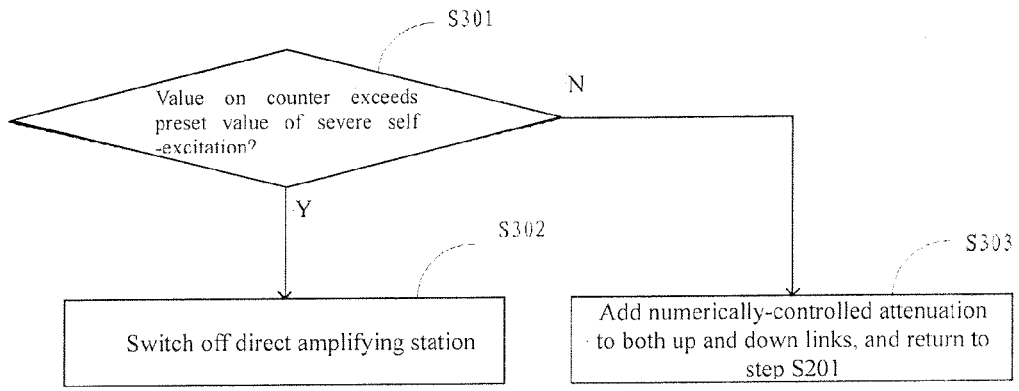
FIG. 3 is the flow chart of dealing with the self-excitation occurring in the repeater according to one embodiment.

At step S208, the threshold value of self-excitation is adjusted according to the signal strength of the up link output power detected after the numerically-controlled attenuation is added. The method then returns to step S201;

At this step, it can be determined that there is no self-excitation in the repeater;

It is to deal with the self-excitation generated in the repeater at step S209:

FIG. 3 shows step S209 provided by the embodiment of the invention for FIG. 2, as well as the process about disposal of the self-excitation generated in the repeater. Details are described as follows.

At step S301, whether the numerical value on the self-excitation counter exceeds the preset serious self-excitation value is determined. If so, it means that the repeater is being subject to a serious self-excitation. The method then proceeds to step S302. Otherwise, it means that the repeater is being subject to a light self-excitation. The method then proceeds to step S303;

At step S303, the repeater is switched off;

The repeater being subject to a serious self-excitation may seriously affect the communication system. The repeater can be switched off if each DC power of the radio frequency module is turned off.

At step S303, the repeater adds the numerically-controlled attenuation to both the up and down links, so as to keep the balance of both the up and down links. And then return to step S201.

In order to increase the accuracy of judgment about whether there is self-excitation occurring in the repeater, besides that the output power of the up link is detected at the above-mentioned step S204 after the numerically-controlled attenuation is added, the preferred embodiment of the invention also includes the step of rectifying the detected output power of the up link after the numerically-controlled attenuation is added. Then, at step S205, judge whether the change in the output power of the up link is equal to that in the numerically-controlled attenuation according to the rectified output power. The rectifying of the output power can be done using the method disclosed in Chinese Patent No. 200710077212.X, which is invented and owned by the same applicant as this application In order to enhance the humanized design of the repeater, besides that the self-excitation is confirmed in the repeater at the above-mentioned step S207, the preferred embodiment of the invention also includes the step of reporting the alarm of self-excitation in the repeater.

Figure 4:
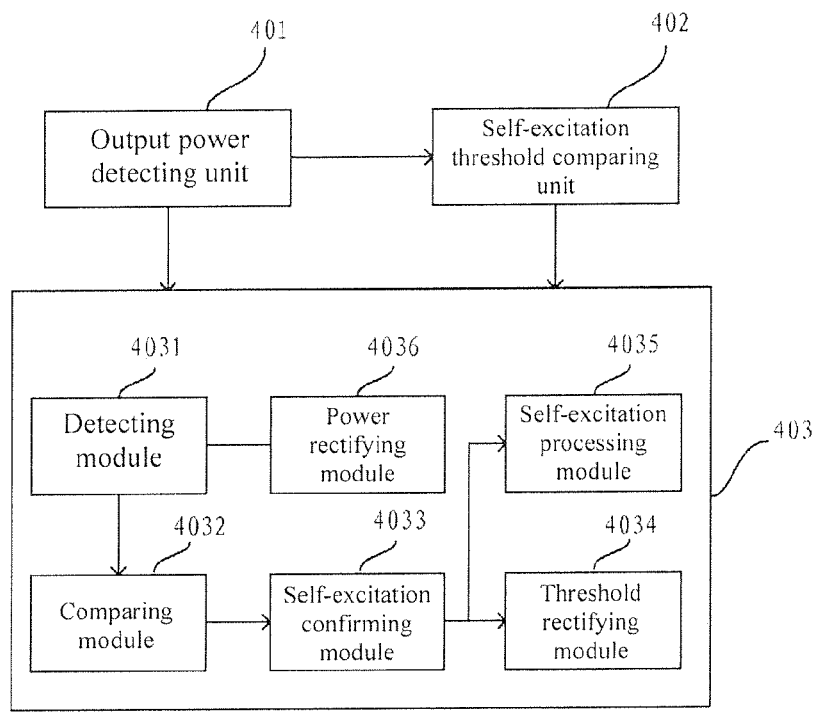
FIG. 4 is a block diagram of one embodiment of a self-excitation detecting system of repeater.

FIG. 4 shows the structure of the self-excitation detecting system of repeater. For clarity, it only shows the part relevant to the embodiment of the invention. This part can be built in the repeater, or operated in the software unit, hardware unit or the unit combining software and hardware in the repeater, or integrated into the repeater as an independent accessory, which includes the following structures.

An output power detecting unit 401 is used for detecting the output power of the up link. In the example, the output power detecting unit 401 can detect the output power of the up link at fixed time according to the detection frequency which can be set as required, for instance 0.001 second and 0.1 second etc.

A self-excitation threshold comparing unit 402 is used for judging whether the output power of the up link detected by the output power detecting unit 401 exceeds the preset threshold of self-excitation. If so, the numerically-controlled attenuation is added to the up link.

An self-excitation judging unit 403 is used for judging whether the change in the output power of the up link is equal to that in the numerically-controlled attenuation after the self-excitation threshold comparing unit 402 adds the numerically-controlled attenuation. Whether there is self-excitation in the repeater is confirmed according to the judgment results.

The self-excitation judging unit includes a detecting module 4031, a comparing module 4032, a self-excitation confirming module 4033, a threshold rectifying module 4034, a self-excitation processing module 4035, and a power rectifying module 4036.

The detecting module 4031 is used for detecting the output power of the up link after the self-excitation threshold comparing unit 402 adds the numerically-controlled attenuation.

The comparing module 4032 is used for comparing the output power of the up link detected by the detecting module 4031 with that detected by the output power detecting unit 401, and judging whether the change in the output power of the up link is equal to that in the numerically-controlled attenuation.

The self-excitation confirming module 4033 is used for judging whether there is count in the self-excitation counter when the judgment result of the comparing module 4032 is equal. It is confirmed that there is no self-excitation occurring if there is no count. If there is count, it is confirmed that the repeater is subject to a self-excitation. When the judgment result of the comparing module 4032 is unequal, 1 is automatically added to the self-excitation counter, and then the self-excitation confirming module 4033 judges whether the numerical value of self-excitation counter exceeds the preset value. If so, it is confirmed that the repeater is subject to a self-excitation.

The threshold rectifying module 4034 is used for adjusting the self-excitation threshold value according to the signal strength of the output power of the up link detected by the detecting module 4031 when the self-excitation confirming module 4033 confirms there is no self-excitation occurring.

After the repeater is confirmed as being subject to a self-excitation, corresponding treatment can be carried out timely. The self-excitation judging unit also includes the following module in the preferential embodiment of the invention:

A self-excitation processing module 4035 is used for dealing with the self-excitation occurring in the repeater as mentioned above.

In order to increase the accuracy of judgment about whether the repeater is subject to a self-excitation, the self-excitation judging unit also includes the following module as another preferential embodiment of the invention:

A power rectifying module 4036 is used for rectifying the output power of the up link detected by the detecting module 4031 after the numerically-controlled attenuation is added to the up link.

The self-excitation detecting method and system for the repeater as well as the repeater in the embodiments of the invention are able to detect and deal with the self-excitation in real time, avoid negative effect on the communication system protect the devices in the repeater and reduce the cost of patrol inspection. Furthermore, they can provide the customers with excellent safety and satisfaction, and meet the needs of the market.

It would be appreciated by those skilled in the art that all or part of the steps of the above-described methods can be performed by hardware as instructed by computer program. The program can be stored in a computer readable storage medium, such as ROM/RAM, magnetic disk and compact disc etc.

The above description is made only with reference to one preferred execution method of the invention, which doesn't place limits on the scope of patent of the invention. Additionally, if persons with ordinary skill in this field make some modifications on the above technical content or the embodiment within the range of technical solution of the invention without departing from the spirit and concept of the invention, these modifications will be within the scope of the present invention.

What is claimed is:

1. A self-excitation detecting method for a repeater, comprising:

detecting an output power of an up link;

judging whether the detected output power of the up link exceeds a threshold of self-excitation and, if so, adding a numerically-controlled attenuation to the up link accordingly; and judging whether the change in the output power of the up link is equal to that in the numerically-controlled attenuation and, judging whether the repeater is subject to a self-excitation according to the result of judgment regarding the change in the output power of the up link; wherein judging whether the change in the output power of the up link is equal to that in the numerically-controlled attenuation and judging whether the repeater is subject to a self-excitation according to the result of judgment comprises:

detecting the output power of the up link to which the numerically-controlled attenuation has been added;

comparing the detected output power of the up link to which the numerically-controlled attenuation has been added with the output power of the up link before the numerically-controlled attenuation is added, and judging whether the change in the output power of the up link is equal to that in the numerically-controlled attenuation;

if they are equal, judging whether there is count in the self-excitation counter; if there is no count, confirming there is no self-excitation; if there is, confirming there is self-excitation in the repeater; if they are unequal, automatically adding 1 to the self-excitation counter, and judging whether the numerical value of self-excitation counter exceeds the preset value; confirming there is self-excitation generated in the repeater when the numerical value of self-excitation counter exceeds the preset value.

2. A self-excitation detecting method of claim 1, wherein, after confirming there is no self-excitation, the method further includes:

adjusting the threshold value of self-excitation according to the signal strength of the detected output power of the up link to which the numerically-controlled attenuation has been added.

3. A self-excitation detecting method of claim 1, wherein, after confirming there is self-excitation generated in the repeater, the method further includes dealing with the self-excitation generated in the repeater.

4. A self-excitation detecting method of claim 1, wherein treatment for the self-excitation generated in the repeater further includes:

judging whether the numerical value on the self-excitation counter exceeds the preset serious self-excitation value; if so, confirming that the repeater is being subject to a serious self-excitation and switching off the repeater; otherwise, confirming that the repeater is being subject to a light self-excitation; and adding the numerically-controlled attenuation to the up and down links respectively.

5. A self-excitation detecting method of claim 1, wherein, after detecting the output power of the up link to which the numerically-controlled attenuation has been added, the method further includes:

rectifying the detected output power of the up link to which the numerically-controlled attenuation has been added.

6. A self-excitation detecting system for a repeater, comprising:

an output power detecting unit configured for detecting the output power of the up link;

a self-excitation threshold comparing unit configured for judging whether the output power of the up link detected by the output power detecting unit exceeds the preset threshold of self-excitation, wherein, if so, the numerically-controlled attenuation is added to the corresponding up link; and a self-excitation judging unit configured for judging whether the change in the output power of the up link is equal to that in the numerically-controlled attenuation after the self-excitation threshold comparing unit adds the numerically-controlled attenuation to the up link, such that whether the repeater is subject to a self-excitation is confirmed according to the result of judgment; wherein the self-excitation judging unit includes:

a detecting module configured for detecting the output power of the up link after the self-excitation threshold comparing unit adds the numerically-controlled attenuation to the up link;

a comparing module configured for comparing the output power of the up link detected by the detecting module with the output power of the up link detected by the output power detecting unit and judging whether the change in the output power of the up link is equal to that in the numerically-controlled attenuation; and a self-excitation confirming module configured for judging whether there is count in the self-excitation counter when the judgment result of the comparing module is equal, wherein, if there is no count, it is confirmed that there is no self-excitation; if there is count, it is confirmed there is self-excitation occurring in the repeater; if the judgment result of the comparing module is unequal, 1 is automatically added to the self-excitation counter; wherein the self-excitation confirming module is further configured for judging whether the numerical value on the self-excitation counter exceeds the preset value, wherein, if so, it is confirmed there is self-excitation occurring in the repeater.

7. A self-excitation detecting system of claim 6, wherein the self-excitation judging unit further includes:

a threshold rectifying module configured for adjusting the threshold value of self-excitation according to the signal strength of the output power of the up link detected by the detecting module when the self-excitation confirming module confirms there is no self-excitation;

a self-excitation processing module configured for dealing with the self-excitation occurring in the repeater; and a power rectifying module configured for rectifying the output power of the up link detected by the detecting module after the numerically-controlled attenuation is added to the up link.

8. A repeater comprising the self-excitation detecting system of any one of claims 6 and 7.

* * * * *